(12) United States Patent
Debnath et al.

(10) Patent No.: US 11,810,398 B2
(45) Date of Patent: Nov. 7, 2023

(54) FACE CLUSTERING WITH IMAGE UNCERTAINTY

(71) Applicant: NEC Laboratories America, Inc., Princeton, NJ (US)

(72) Inventors: Biplob Debnath, Princeton, NJ (US); Srimat Chakradhar, Manalapan, NJ (US); Giuseppe Coviello, Princeton, NJ (US); Yi Yang, Princeton, NJ (US)

(73) Assignee: NEC Corporation

( * ) Notice: Subject to any disclaimer, the term of this patent is extended or adjusted under 35 U.S.C. 154(b) by 127 days.

(21) Appl. No.: 17/526,492

(22) Filed: Nov. 15, 2021

(65) Prior Publication Data

US 2022/0156484 A1     May 19, 2022

Related U.S. Application Data

(60) Provisional application No. 63/114,212, filed on Nov. 16, 2020.

(51) Int. Cl.
*G06V 40/16*     (2022.01)
*G06V 10/75*     (2022.01)
*G06F 18/10*     (2023.01)
*G06F 18/2321*   (2023.01)

(52) U.S. Cl.
CPC ........... *G06V 40/172* (2022.01); *G06F 18/10* (2023.01); *G06F 18/2321* (2023.01); *G06V 10/751* (2022.01)

(58) Field of Classification Search
CPC .... G06V 40/172; G06V 10/751; G06F 18/10; G06F 18/2321
See application file for complete search history.

(56) References Cited

U.S. PATENT DOCUMENTS

| | | | |
|---|---|---|---|
| 2003/0068100 A1* | 4/2003 | Covell | G06T 7/13 382/305 |
| 2008/0089561 A1* | 4/2008 | Zhang | G06V 10/771 707/E17.024 |
| 2016/0125232 A1* | 5/2016 | Zhang | G06V 10/764 382/118 |
| 2023/0030267 A1* | 2/2023 | Chen | G06V 10/987 |

OTHER PUBLICATIONS

Debnath, Biplob, et al. "UAC: An Uncertainty-Aware Face Clustering Algorithm", InProceedings of the IEEE/CVF International Conference on Computer Vision. Oct. 2021, pp. 3487-3495.

\* cited by examiner

*Primary Examiner* — David Perlman
(74) *Attorney, Agent, or Firm* — Joseph Kolodka

(57) ABSTRACT

Methods and systems for face clustering include determining a quality score for each of a set of input images. A first subset of the input images is clustered, having respective quality scores that exceed a predetermined threshold, to form an initial set of clusters. A second subset of the input images is clustered, having respective quality scores below the predetermined threshold. An action is performed responsive to the clustered images after the second subset is added to the initial set of clusters.

16 Claims, 8 Drawing Sheets

FACE CLUSTERING WITH IMAGE UNCERTAINTY

RELATED APPLICATION INFORMATION

This application claims priority to U.S. Provisional Patent Application No. 63/114,212, filed on Nov. 16, 2020, incorporated herein by reference in its entirety.

BACKGROUND

Technical Field

The present invention relates to face recognition, and, more particularly, to clustering similar faces.

Description of the Related Art

Face clustering seeks to identify similar faces across different images from a video stream and across different video streams. This helps to track a person's movements in a monitored space.

SUMMARY

A method for face clustering includes determining a quality score for each of a set of input images. A first subset of the input images is clustered, having respective quality scores that exceed a predetermined threshold, to form an initial set of clusters. A second subset of the input images is clustered, having respective quality scores below the predetermined threshold. An action is performed responsive to the clustered images after the second subset is added to the initial set of clusters.

A method for face clustering includes determining a quality score for each of a set of input images, including determining a probabilistic face embedding for each of the set of input images. A first subset of the input images is clustered, having respective quality scores that exceed a predetermined threshold, to form an initial set of clusters. A second subset of the input images is clustered, having respective quality scores below the predetermined threshold, by adding images of the second subset to respective clusters of the initial set of clusters. Face recognition is performed on a new image by comparing the new image to references images of each of the initial set of clusters. An action is performed responsive to the clustered images after the second subset is added to the initial set of clusters.

A system for face clustering includes a hardware processor and a memory that stores a computer program. When executed by the hardware processor, the computer program causes the hardware processor to determine a quality score for each of a set of input images, to cluster a first subset of the input images, having respective quality scores that exceed a predetermined threshold, to form an initial set of clusters, to cluster a second subset of the input images, having respective quality scores below the predetermined threshold, and to perform an action responsive to the clustered images after the second subset is added to the initial set of clusters.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Incorporating uncertainty information into face clustering processes is challenging. Augmenting existing face clustering approaches with uncertainty information does not provide better accuracy. This is due to a large number of false negative results when matching face images, which can produce over-clustering—the creation of unnecessary distinct clusters.

To address this challenge, a probabilistic face quality estimate is used to model uncertainty in a face image. The face image quality estimate may use a quality metric that accurately reflects the quality of clusters when uncertainty information is provided. The estimate can be used in a two-phase clustering process. In the first phase, the face quality estimate is used to identify high-quality face images, and these high-quality images are used to create initial clusters. In the second phase, face images with lower quality estimates are added into the existing initial clusters. In this way, low-quality images are prevented from disrupting the clustering scheme, providing significantly better clustering by keeping the number of clusters close to a predetermined ground-truth value.

Figure 1:
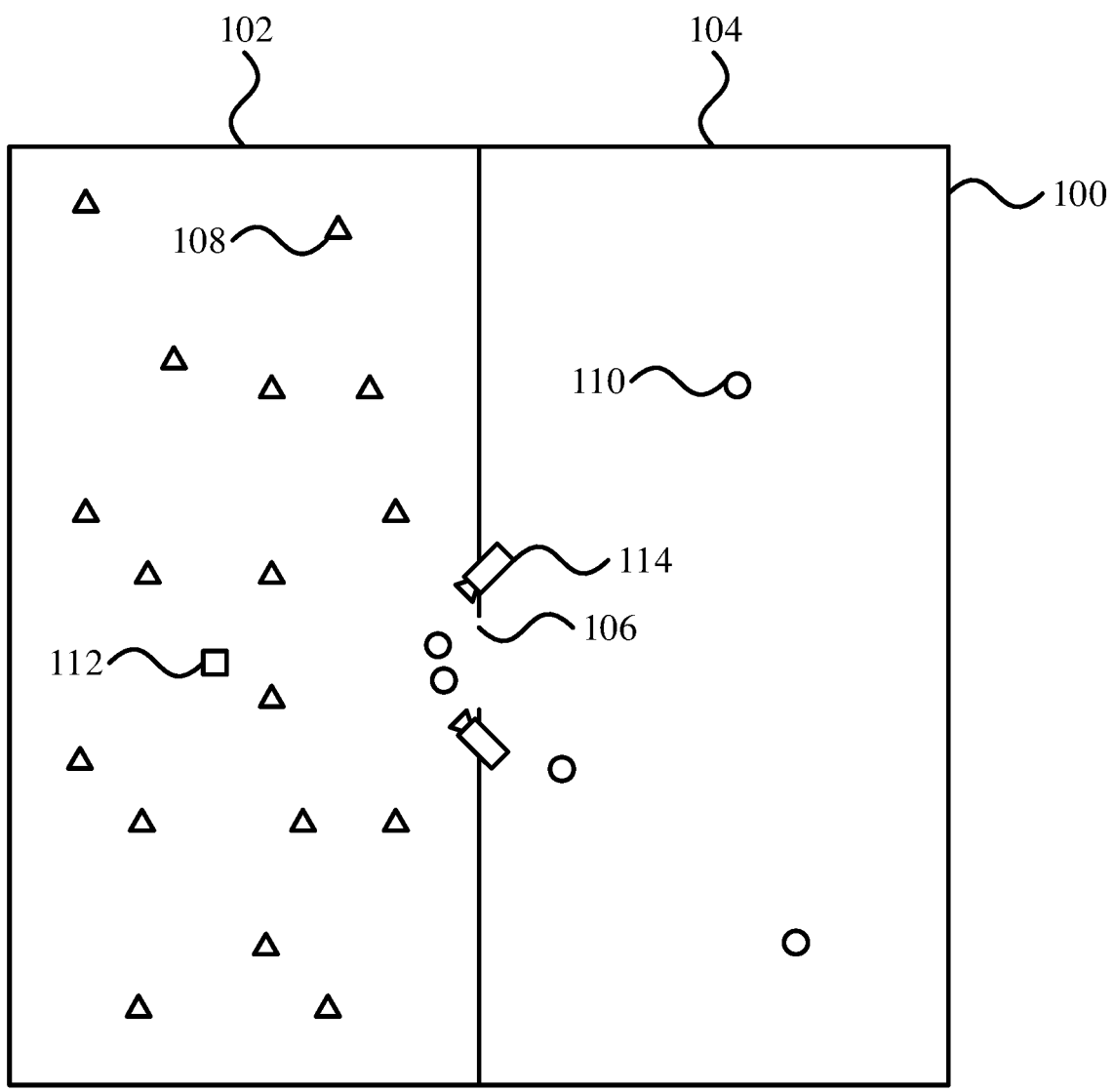
FIG. 1 is a diagram of an environment that is monitored by video cameras, where matching face images may be clustered together, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is an attacker 112, shown as a square. The unauthorized individuals 108 are permitted access to the uncontrolled region 102, but not to the controlled region 104. The authorized individuals are permitted access to both the uncontrolled region 102 and the controlled region 104. The attacker 112 is seeks to undermine the efficacy of the facial recognition system, for example by providing visual inputs that affect the facial recognition model being used.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104.

The video streams generated by the video cameras 114 may be processed to identify objects within the frames of the video streams. Although face detection is specifically described herein, it should be understood that any kind of processing may be performed, for example to identify vehicles, license plates, animals, etc. The detected object may be compared to objects in a watchlist. In the case of faces, a similarity metric may be used to compare a detected face from a frame of the video streams to a set of different faces that are stored in the watchlist.

Facial recognition systems can solve various tasks, such as face identification and face verification. Face identification returns an identity associated with a given face, while face verification indicates whether a given face has the same identity as a stored face image. As a person moves through the environment 100, they will pass from the visual field of one video camera 114 to that of another video camera 114. Using face clustering, similar face images can be identified and connected to one another, regardless of the video source.

The clustered face information may be used to gather information about the movement of individuals, both singly and in aggregate. For example, consider a business that wants to obtain demographic information about its customers. Face clustering across video streams can help the business determine the number of distinct customers, the number of returning customers, time spent at the business, time spent at particular displays within the business, and demographic information regarding the customers themselves. Clustering can benefit the identification of demographic information for a customer, for example by providing averaging across a variety of different poses, degrees of occlusion, and degrees of illumination.

Face clustering can also help track the motion of individuals across the environment. This type of tracking is of particular interest in performing contact tracing. For example, in the event of a pandemic, the identification of contacts between infected individuals and other individuals can help to notify those other individuals of their risk, before they become contagious themselves. In such an application, the environment 100 may not be limited to a single building or business, but may cover a large municipal or geographical area, including a very large number of cameras 114.

Figure 2:
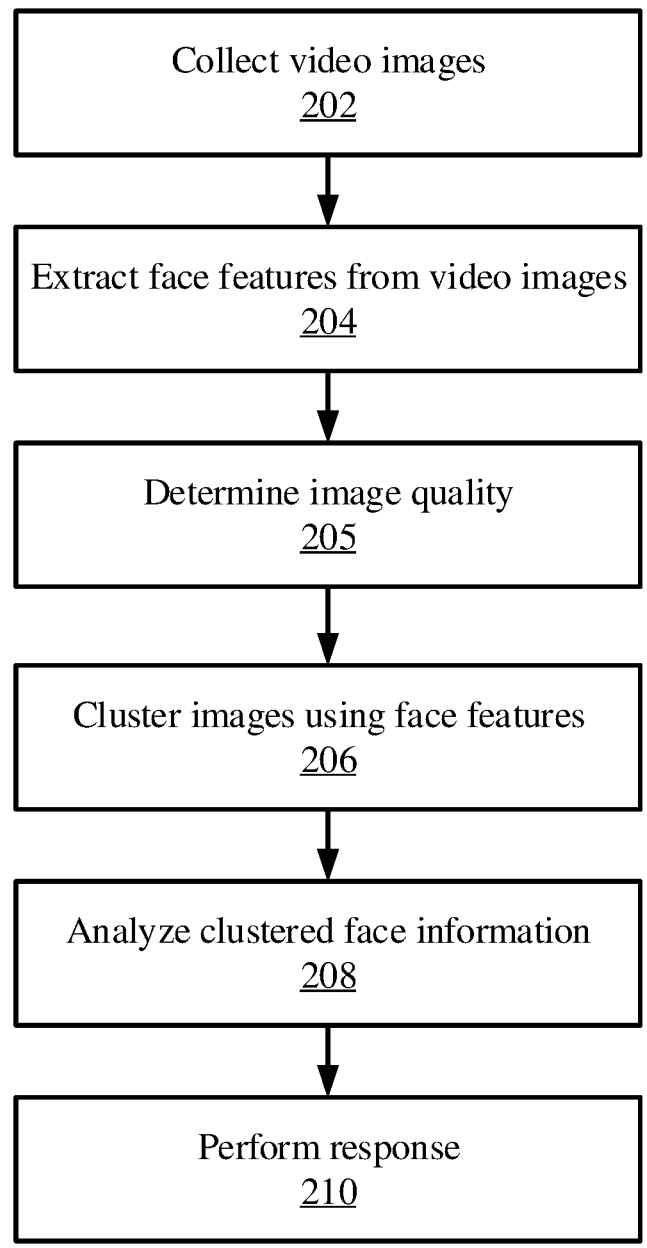
FIG. 2 is a block/flow diagram that shows a method for clustering, analyzing, and responding to face images using image quality, in accordance with an embodiment of the present invention.

Referring now to FIG. 2, a method of analyzing and responding to clustered video information is shown. Cameras 114 provide their respective video streams as inputs at block 202. Face features are extracted from the video streams in block 204, which may include face detection. For each detected face in an image of a video stream, block 204 generates a feature vector representation.

Face images captured by video cameras are inherently noisy. A combination of factors, including differences in lighting, pose, occlusion, facial expression, and the technical limitations of the camera introduce differences between two images taken of the same person. Facial features may be learned by deterministic face embedding models, but ambiguous features or occluded features can lead to representations with substantial uncertainty in the latent space. A probabilistic embedding may represent each face image as a multivariate Gaussian distribution in the latent space.

Block 205 determines quality scores for the face images. As will be described in greater detail below, probabilistic face embedding provides a distributional estimate, rather than a point estimate, in a latent space for an input face image. This estimate includes an uncertainty value, which can be used to determine a quality of the face images.

Using the quality scores, clustering may be performed in block 206. As will be described in greater detail below, this clustering may be performed in multiple phases, with a first phase that clusters high-quality face images and with a second phase that adds lower-quality face images to the previously determined clusters. This provides a set of face image clusters that is not affected by the false negative results that would result from clustering the lower-quality images along with the high-quality images.

Using the clustered face information, block 208 performs analysis on the video streams to determine one or more facts about the recorded video. For example, this analysis may include performing face recognition on images within a video stream to match faces to references images within the clusters. When a match is found between an input image and one of the reference images, it can be determined that the face has been recognized as belong to the same person as is represented by other images in the matching cluster.

Block 210 then performs a responsive action, such as a security action, a promotional action, a health & safety action, or a crowd control action. Actions that may be performed include automatically changing displays in accordance with customers' interest, performing contact tracing, and notifying individuals who were in contact with an infected person. It should be noted that, although the present description focuses on face images, the same principles may be applied to clustering images of any object, such as vehicles, animals, etc.

Face images captured by video cameras are inherently noisy. A combination of factors, including differences in lighting, pose, occlusion, facial expression, and the technical limitations of the camera introduce differences between two images taken of the same person. Facial features may be learned by deterministic face embedding models, but ambiguous features or occluded features can lead to representations with substantial uncertainty in the latent space. A probabilistic embedding may represent each face image as a multivariate Gaussian distribution in the latent space.

As noted above, embedded facial features may be compared in a latent space. In an unconstrained face setting, the facial features learned by the embedding model can be ambiguous or may not even be present in the input face, leading to noisy latent representations. Probabilistic face embedding gives a distributional estimation instead of a point estimation in the latent space for each input face image. The mean of the distribution can represent the most likely latent feature values, while the span of the distribution, or variance, can represent the noise or uncertainty of these estimates. Probabilistic solutions can be derived for matching and fusing probabilistic face embeddings using this uncertainty information.

Thus, each face image may be represented as a multivariate Gaussian distribution $\mathcal{N}(\mu, \sigma^2)$. Given a pre-trained face recognition model, the vector $\mu$ may be a fixed, deterministic embedding generated by the face recognition model. The probabilistic face embedding adds an extra branch to the face recognition model to learn the variance vector $\sigma^2$. This extra branch may be trained using a mutual likelihood score, which measures the similarity between two probabilistic face embedding distributions. Given the representations of a pair of images, the mutual likelihood score measures the likelihood that the images are of the same person—in other words, the likelihood that they share the same latent code. The variance vector $\sigma^2$ represents the data uncertainty in a face image. Data uncertainty learning can learn both $\mu$ and $\sigma^2$ at the same time.

Probabilistic face embedding can therefore be used to estimate the data uncertainty of a face image as a part of determining the quality score in block 205. If the probabilistic embedding represents each face image by a multivariate Gaussian distribution, $\mu_1, \mu_2, \ldots, \mu_D, \sigma_1^2, \sigma_2^2, \ldots, \sigma_D^2$, where D is the feature dimension, then the estimated uncertainty is the harmonic mean of the variances across all dimensions:

$$\text{uncertainty} = \frac{D}{\sum_{i=1}^{D} \frac{1}{\sigma_i^2}}$$

Uncertainty estimates generated by probabilistic face embedding may be too small to interpret intuitively. Block 205 may therefore generate a face estimate value between, e.g., zero and one, that can be interpreted as a probability that a face image is of good quality. This metric is effective when used to cluster face images.

Figure 3:
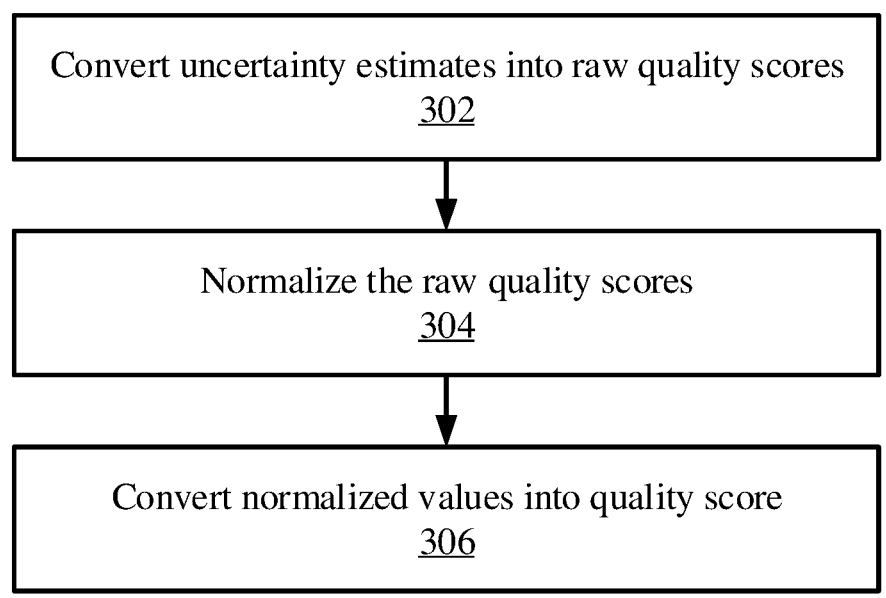
FIG. 3 is a block/flow diagram that shows a method for determining a quality score for an input image based on probabilistic embedding, in accordance with an embodiment of the present invention.

Referring now to FIG. 3, a method for determining a quality score for a face image is shown. This method may be used as a part of block 205. Block 302 converts the uncertainty estimates from probabilistic face embedding into raw quality scores, which may be defined such that a lower raw score value implies a higher image quality. The raw quality score may be calculated as:

$$\text{quality}_{raw} = 1 - \text{uncertainty}$$

Block 304 normalizes the raw quality scores. This normalization may be calculated as:

$$\text{quality}_z = \frac{\text{quality}_{raw} - \text{mean}}{std}$$

where mean is the mean of the raw quality scores and std is the standard deviation of the raw quality scores for the face images in a dataset. These normalized values may then be converted into a probabilistic face image quality score by using a logistic function, such as:

$$\text{quality} = S(\text{quality}_z) \text{ where}$$

$$S(x) = \frac{1}{1 + e^{-x}}$$

Figure 4:
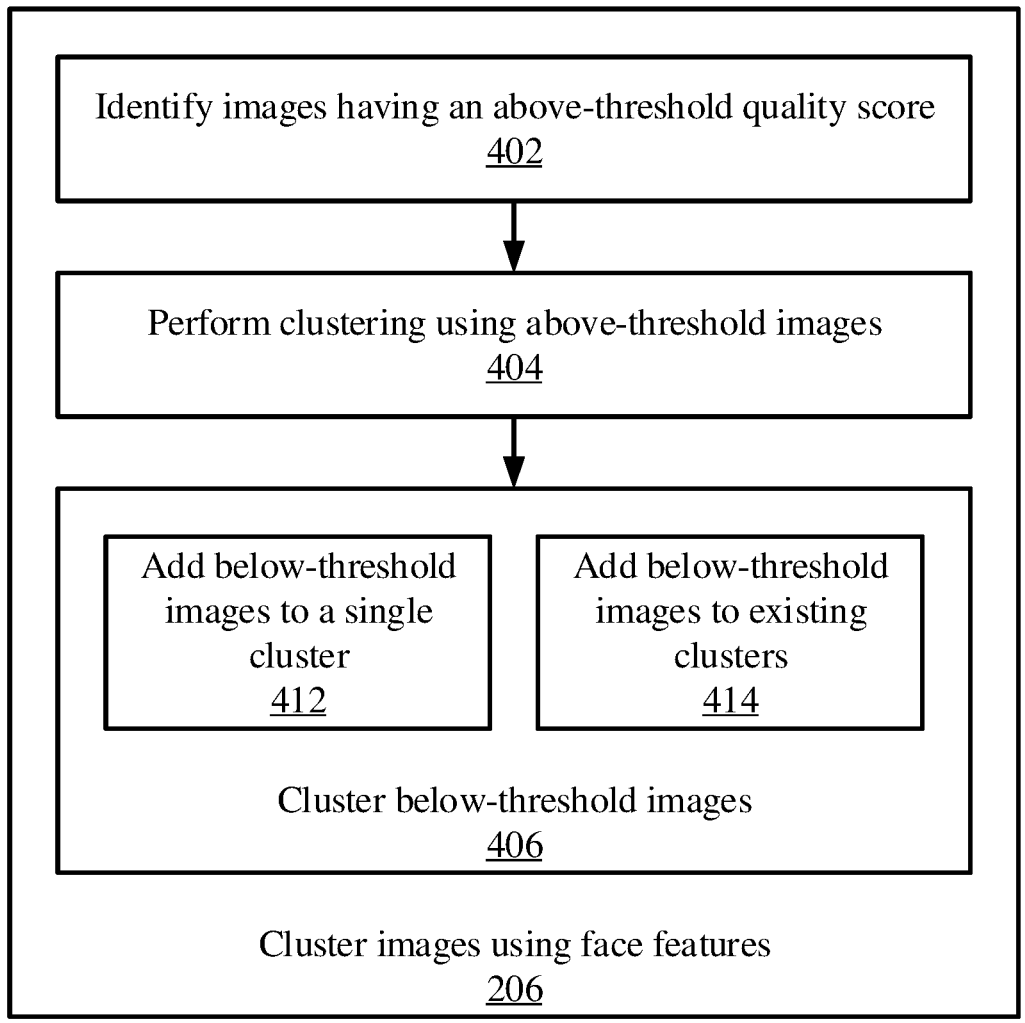
FIG. 4 is a block/flow diagram that shows a method for clustering images using face features, based on a quality score for each image, in accordance with an embodiment of the present invention.

Referring now to FIG. 4, additional detail on the clustering of block 206 is shown. Block 402 identifies images having a quality score that is above a predetermined threshold value. Any appropriate threshold value may be used. Block 404 performs clustering using those images which have above-threshold quality scores. This clustering may select the relatively high-quality images and forms clusters with them based on their similarity to one another, such that face images which are more similar to one another are more likely to be clustered together than face images that are dissimilar to one another. This represents a first phase of the clustering.

Block 406 then clusters the remaining images, which have a below-threshold quality score. There are multiple ways that this second-phase clustering may be performed. In a first option, block 412 may add all of the below-threshold face images to a single cluster. In this case, the below-threshold face images may be added to a new cluster that is made specifically for the low-quality images, separate from the initial clusters.

In a second option, the low-quality face images may be added to the existing clusters that were created in block 404, with each being assigned to a cluster that it matches best. For example, a threshold may be selected for a similarity metric, to determine whether two face images are similar. This similarity metric need not satisfy the transitive property—in other words, two face images that are similar to a third image need not be similar to one another. Thus, every low-quality image may be matched against every member of each cluster.

However, this has a time complexity of $O(n^2)$, where n is the total number of face images. To decrease the time complexity, a reference image from each cluster may be used. Possible heuristics for selecting the reference image may include selecting a reference face image from each cluster with a highest quality score, randomly selecting a reference face image from each cluster, and determining a covering set that includes a few face images with high quality scores. This reduces the time complexity to $O(n)$.

To evaluate the quality of the clusters in the presence of uncertainty, a purity adjusted amplification score (PAAS) may be used, defined as the ratio of purity to amplification. Thus, the PASS score can be calculated as purity/amplitude.

The purity value may be calculated by assigning each cluster to a most frequent ground truth identity. For example, if a cluster includes three face images from a first person, four faces from a second person, and five faces from a third person, the five faces of the third person may be considered the ground truth, with a purity score of 5/(3+4+5). The cluster assignment accuracy may be estimated as the ratio of the total number of correctly assigned faces and the total number of faces. This value may be used as the purity value.

Amplification measures the degree of over-clustering with respect to the ground truth identities. For each identity, a number of clusters can be determined that include faces similar to an example face image. The amplification may be calculated as:

$$\text{amplification} = \frac{I}{\sum_{i=1}^{I} \frac{1}{\text{count}_i}}$$

where $\text{count}_i$ is the count of different clusters for the faces corresponding to the $i^{th}$ identity and I is the total number of identities. A good clustering outcome may have amplification values that are close to 1, and bad clustering outcomes may have values that are much larger than 1. However, the best amplification value would be achieved with a single cluster, so amplification alone cannot suffice as a metric to evaluate clustering. The use of the purity value solves this problem.

The purity adjusted amplification score (PAAS) is a composite metric that measures contradictory qualities of the clustering. A random clustering algorithm can easily get a perfect score for either amplification or purity, but it is rare for random clustering to get good scores for both. This score lies between 0 and 1, and can be used to compare different clustering techniques.

Figure 5:
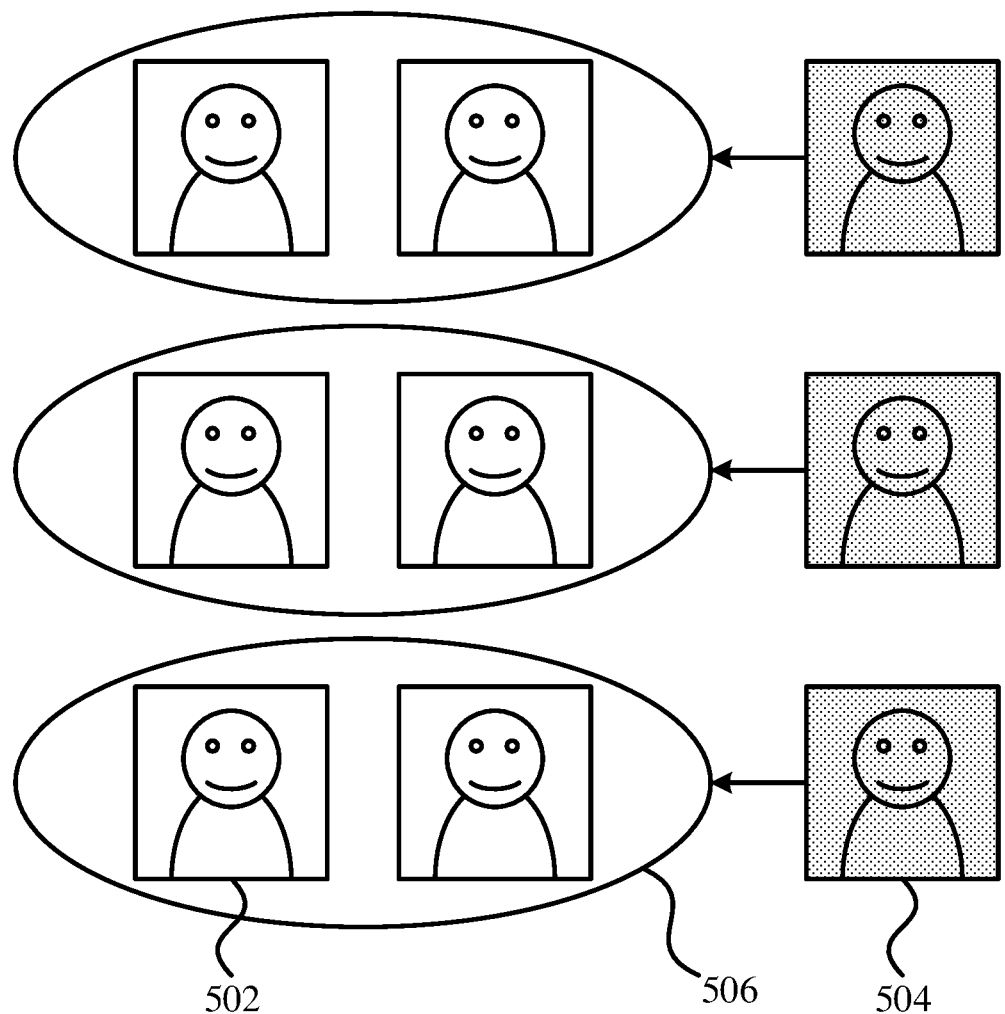
FIG. 5 is a diagram that shows a two-phase clustering process, where higher-quality images are clustered first and lower-quality images are clustered second, in accordance with an embodiment of the present invention.

Referring now to FIG. 5, a diagram of the two-phase clustering is shown. A number of high-quality face images 502 and a number of low-quality face images 504 are shown. The high-quality face images 502 have a quality score that is above a threshold, while the low-quality face images 504 have a quality score that is below the threshold. The quality of the face images may be affected by a number of factors, as described in greater detail above.

The high-quality face images 502 are clustered during the first phase to create a set of clusters 506. Each cluster 506 includes a set of high-quality face images 502 that are similar to one another according to some similarity metric. The low-quality face images 504 are then added to these first-phase clusters in accordance with their respective similarities to the images of the clusters. Any appropriate process for determining the appropriate cluster may be used, including an exhaustive search of all images in all clusters or comparison to reference images.

Figure 6:
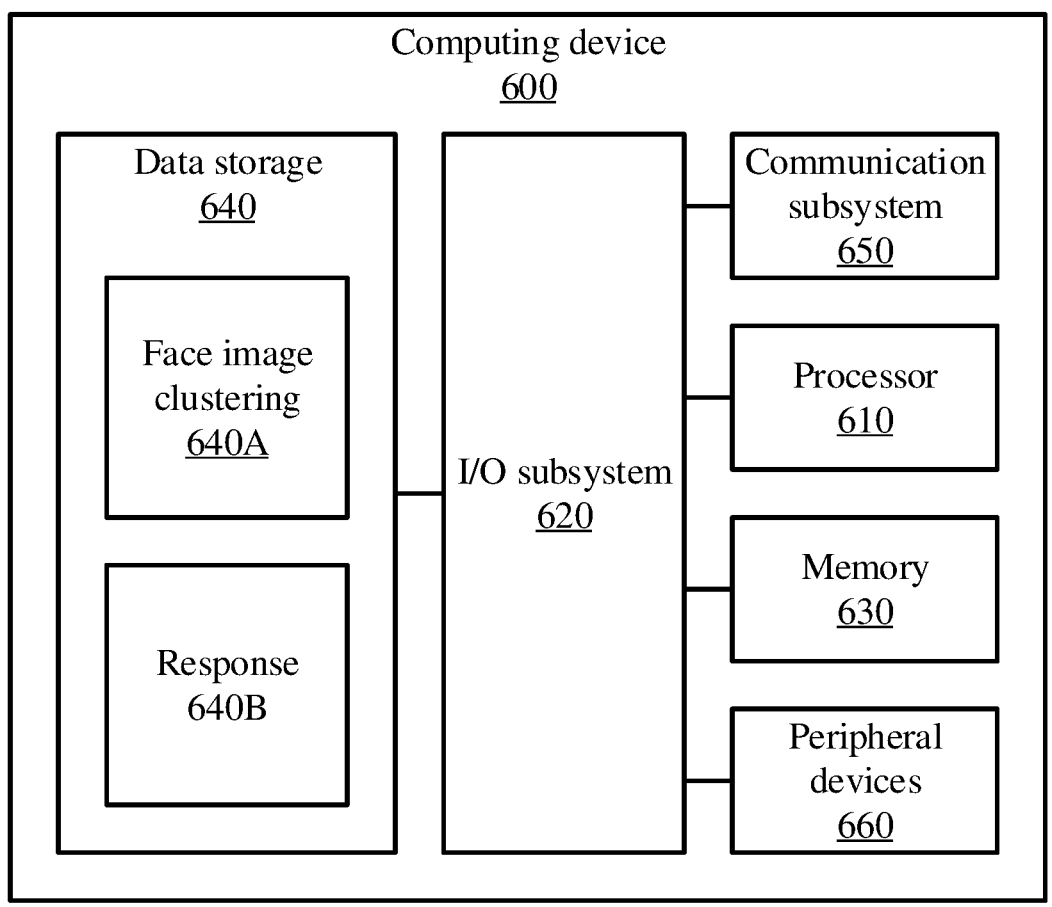
FIG. 6 is a block diagram that shows a computing device that may be used for face image clustering and response, in accordance with an embodiment of the present invention.

Referring now to FIG. 6, a block diagram shows an exemplary computing device 600, in accordance with an embodiment of the present invention. The computing device 600 is configured to identify a top-down parametric representation of an indoor scene and provide navigation through the scene.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for face image clustering with uncertainty, for example using a two-phase clustering process, and program code 640B for analyzing and responding to video information. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to affect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, video capture device, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

These and other variations of a hardware processor subsystem are also contemplated in accordance with embodiments of the present invention.

Figure 7:
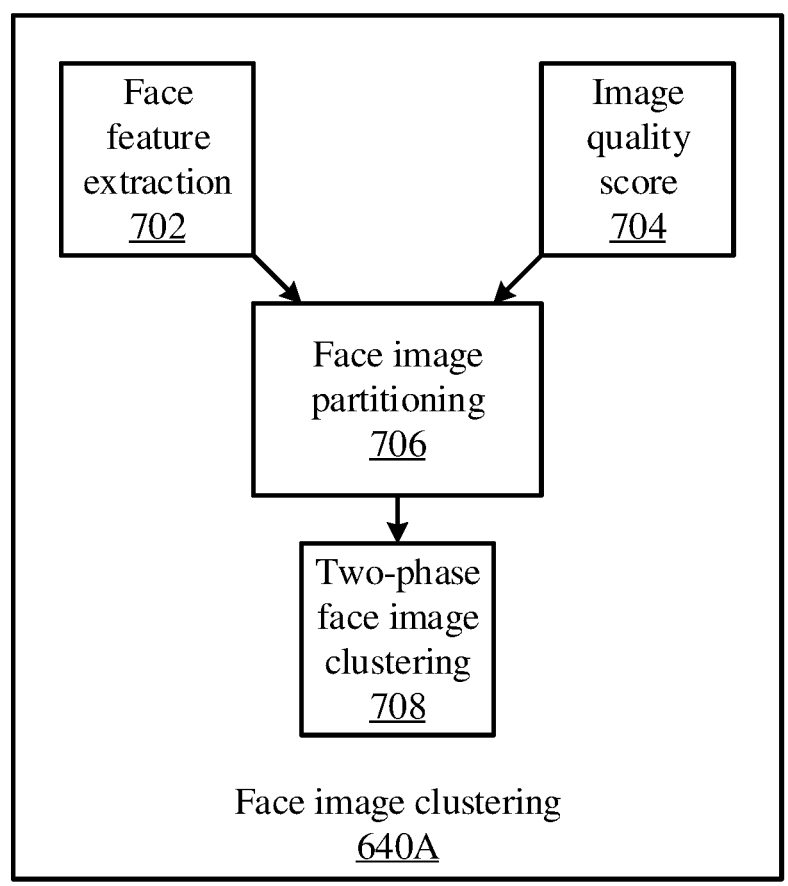
FIG. 7 is a block diagram that shows face image clustering, in accordance with an embodiment of the present invention.

Referring now to FIG. 7, additional detail on the face image clustering 640A is shown. Face feature extraction 702 may detect faces within images of a video stream and may extract features for the detected faces. An image quality score 704 may be determined for each detected face. Face image partitioning 706 may then split the face images into a high-quality group and a low-quality group by comparing the respective image quality scores 704 to a predetermined threshold.

Two-phase face image clustering 708 may then cluster the partitioned face images, for example by performing a first clustering on the high-quality images and then by assigning the low-quality images to clusters determined by the first clustering. The output may identify face image clusters that belong to respective distinct individuals, for later analysis and response.

Figure 8:
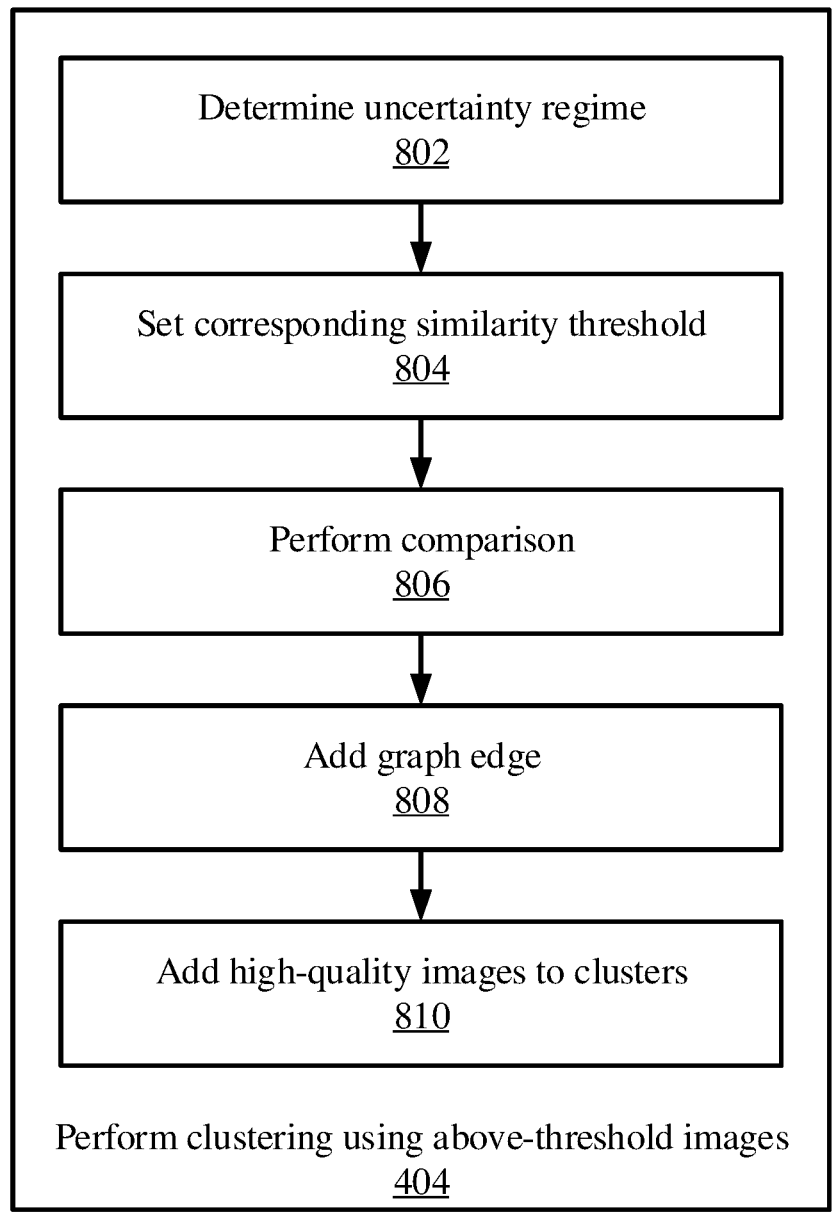
FIG. 8 is a block/flow diagram that shows additional detail on how high-quality images may be clustered together, in accordance with an embodiment of the present invention.

Referring now to FIG. 8, an exemplary clustering method is shown. The different scenarios for matching two face images, with varying levels of uncertainty, can be split into four regimes: A low-low regime, where each face has a low degree of uncertainty, a low-high regime and a high-low regime, where either the first or second face image has a high uncertainty and the other has a low uncertainty, and a high-high regime, where both face images have high uncertainty.

In the low-low regime, both deterministic and probabilistic embeddings provide accurate estimates, because the data uncertainty is low, and clustering algorithms will correctly cluster both faces. In the high-high regime, both deterministic and probabilistic embeddings provide inaccurate estimates, due to the high uncertainty of both face images. Face matching in the high-high regime may be either true positives or false positives.

In the low-high regime and the high-low regime, both deterministic and probabilistic embeddings provide inaccurate estimates, because the data uncertainty of one of the face images is high. This scenario leads to false negatives, where face images from the same person are incorrectly deemed to be dissimilar.

When matching faces based on similarity, a similarity threshold may be used. The default is that of the low-low regime, where there is low uncertainty in both face images. For example, this base similarity threshold E may be set at 0.50, but the value of the threshold may vary when face images from other regimes are compared. For example, in the low-high and high-low regimes, the similarity threshold may be lowered to $\epsilon - \Delta_{HL}$. Lowering the threshold in this scenario reduces false negatives.

In the high-high regime, it is difficult to distinguish between true positive results and false positive results. Thus, similarity estimates may be ignored entirely when the uncertainty level of both images is high, for example by raising the similarity threshold to $\infty$. When there is at least one image with a low uncertainty score, the similarity score can be trusted to at least some extend. When both images have a high uncertainty score, the similarity cannot be trusted.

The face images in a set may be represented as nodes in a graph, which is initialized to have no edges. For each pair of images in the set, block 802 determines which uncertainty regime the pair of images lie within. Block 804 then sets a corresponding similarity threshold for the pair of images, as described above. Block 806 then compares the pair of face images, generating a similarity score. If the similarity score is above the threshold set by block 804, then block 808 adds an edge between the nodes to the graph.

At this point, the graph includes interconnected sub-graphs of similar face images. Block 810 adds the face images to clusters based on these interconnected sub-graphs, with the further criterion each face image that is added to the respective cluster has an uncertainty that is below a threshold. This threshold may be the same uncertainty threshold as is used to determine which uncertainty regime the image belongs to, or may be a separate threshold value. In this manner, the influence of low-quality images on the clusters may be limited.

In some cases, the uncertainty of each cluster may be determined, and only those clusters with below-threshold uncertainty may be used in the final output of the clustering process.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for face clustering, comprising:
    determining a quality score for each of a set of input images, including determining a probabilistic face embedding for each of the set of input images and normalizing an uncertainty of the probabilistic face embedding for each of the set of input images;
    clustering a first subset of the input images, having respective quality scores that exceed a predetermined threshold, to form an initial set of clusters;
    clustering a second subset of the input images, having respective quality scores below the predetermined threshold; and
    performing an action responsive to the clustered images after the second subset is added to the initial set of clusters.

2. The method of claim 1, wherein determining the probabilistic face embedding for each of the set of input images includes determining a mean and a standard deviation.

3. The method of claim 2, wherein determining the quality score includes dividing a difference between a raw quality score and a mean value by a standard deviation for the probabilistic face embedding for each of the set of input images.

4. The method of claim 1, wherein clustering the second subset of the input images includes adding the second subset of the input images to a same new cluster, distinct from the initial set of clusters.

5. The method of claim 1, wherein clustering the second subset of the input images includes adding images of the second subset to respective clusters of the initial set of clusters.

6. The method of claim 1, further comprising comparing each image of the second subset to a reference image of each of the initial set of clusters to determine a respective cluster for assignment.

7. The method of claim 1, wherein clustering the first subset of the images includes determining similarities between images in the first subset of the input images and applying different similarity thresholds for pairs of images in the first subset in different respective uncertainty regimes.

8. The method of claim 1, wherein the action is selected from the group consisting of a security action, a promotional action, a health & safety action, and a crowd control action.

9. A computer-implemented method for face clustering, comprising:

determining a quality score for each of a set of input images, including determining a probabilistic face embedding for each of the set of input images;

clustering a first subset of the input images, having respective quality scores that exceed a predetermined threshold, to form an initial set of clusters, including determining similarities between images in the first subset of the input images and applying different similarity thresholds for pairs of images in the first subset in different respective uncertainty regimes;

clustering a second subset of the input images, having respective quality scores below the predetermined threshold, by adding images of the second subset to respective clusters of the initial set of clusters;

performing face recognition on a new image by comparing the new image to references images of each of the initial set of clusters; and performing an action responsive to the clustered images after the second subset is added to the initial set of clusters.

10. A system for face clustering, comprising:

a hardware processor; and a memory that stores a computer program, which, when executed by the hardware processor, causes the hardware processor to:

determine a quality score for each of a set of input images, including a determination of a probabilistic face embedding for each of the set of input input and a normalization of an uncertainty of the probabilistic face embedding for each of the set of input images;

cluster a first subset of the input images, having respective quality scores that exceed a predetermined threshold, to form an initial set of clusters;

cluster a second subset of the input images, having respective quality scores below the predetermined threshold; and perform an action responsive to the clustered images after the second subset is added to the initial set of clusters.

11. The system of claim 10, wherein the computer program further causes the hardware processor to determine a mean and a standard deviation of the probabilistic face embedding.

12. The system of claim 11, wherein the computer program further causes the hardware processor to divide a difference between a raw quality score and a mean value by a standard deviation for the probabilistic face embedding for each of the set of input images.

13. The system of claim 10, wherein the computer program further causes the hardware processor to add the second subset of the input images to a same new cluster, distinct from the initial set of clusters.

14. The system of claim 10, wherein the computer program further causes the hardware processor to add images of the second subset to respective clusters of the initial set of clusters.

15. The system of claim 10, wherein the computer program further causes the hardware processor to compare each image of the second subset to a reference image of each of the initial set of clusters to determine a respective cluster for assignment.

16. The system of claim 10, wherein the computer program further causes the hardware processor to perform face recognition on an input image by comparing the input image to reference images of each of the initial set of clusters.

* * * * *